United States Patent
Yi et al.

(10) Patent No.: US 10,313,075 B2
(45) Date of Patent: Jun. 4, 2019

(54) METHOD AND APPARATUS FOR PERFORMING CELL ON/OFF OPERATION IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Kijun Kim, Seoul (KR); Byounghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 47 days.

(21) Appl. No.: 15/306,694

(22) PCT Filed: Apr. 28, 2015

(86) PCT No.: PCT/KR2015/004271
§ 371 (c)(1),
(2) Date: Oct. 25, 2016

(87) PCT Pub. No.: WO2015/167232
PCT Pub. Date: Nov. 5, 2015

(65) Prior Publication Data
US 2017/0048041 A1 Feb. 16, 2017

Related U.S. Application Data

(60) Provisional application No. 61/985,449, filed on Apr. 28, 2014, provisional application No. 62/059,169, filed on Oct. 3, 2014.

(51) Int. Cl.
*H04W 4/00* (2018.01)
*H04L 5/00* (2006.01)
(Continued)

(52) U.S. Cl.
CPC ........... *H04L 5/0048* (2013.01); *H04W 8/005* (2013.01); *H04W 52/0206* (2013.01);
(Continued)

(58) Field of Classification Search
CPC ............ H04W 8/005; H04W 52/0206; H04W 72/042; H04W 28/26; H04L 5/0048; H04L 5/001
See application file for complete search history.

(56) References Cited

U.S. PATENT DOCUMENTS

2012/0287875 A1 11/2012 Kim et al.
2013/0343288 A1 12/2013 Ratasuk et al.
(Continued)

FOREIGN PATENT DOCUMENTS

WO 2014003328 A1 1/2014

OTHER PUBLICATIONS

Mediatek Inc., "Performance comparison of small cell discovery signal designs," R1-140246, 3GPP TSG-RAN WG1 Meeting #76, Prague, Czech Republic, Feb. 1, 2014.
(Continued)

*Primary Examiner* — Abdelnabi O Musa
(74) *Attorney, Agent, or Firm* — Dentons US LLP

(57) ABSTRACT

A method and apparatus for transmitting a periodic reference signal in a wireless communication system is provided. An evolved NodeB (eNB) configures a periodic reference signal, and transmits the periodic reference signal in a specific duration. The periodic reference signal may be a discovery reference signal (DRS) or a channel state information reference signal (CSI RS). The periodic reference signal may be transmitted flexibly or transmitted by performing listen-before-talk (LBT) with reservation of transmission of the periodic reference signal.

5 Claims, 9 Drawing Sheets

(51) Int. Cl.
*H04W 8/00* (2009.01)
*H04W 72/04* (2009.01)
*H04W 52/02* (2009.01)
*H04W 28/26* (2009.01)

(52) U.S. Cl.
CPC .......... *H04W 72/042* (2013.01); *H04L 5/001* (2013.01); *H04W 28/26* (2013.01)

(56) References Cited

U.S. PATENT DOCUMENTS

| | | | | |
|---|---|---|---|---|
| 2015/0189574 A1* | 7/2015 | Ng | ................ | H04W 24/08 370/252 |
| 2015/0208269 A1* | 7/2015 | Damnjanovic | ....... | H04L 1/0026 370/252 |
| 2015/0264592 A1* | 9/2015 | Novlan | ............... | H04L 27/2601 370/252 |
| 2015/0264699 A1* | 9/2015 | Fwu | ..................... | H04L 5/0001 370/329 |
| 2015/0271744 A1* | 9/2015 | Liu | ..................... | H04L 5/005 370/329 |

OTHER PUBLICATIONS

Huawei, et al., "Enhancements of RRM measurements for small cell on/off," R1-140038, 3GPP TSG RAN WG1 Meeting #76, Prague, Czech Republic, Feb. 1, 2014.

Huawei, et al., "Discovery design options," R1-140039, 3GPP TSG RAN WG1 Meeting #76, Prague, Czech Republic, Feb. 1, 2014.

Search Report of European Patent Office in Appl'n No. 15786788.8, dated Oct. 30, 2017.

Office Action of Chinese Patent Office in Appl'n No. 201580023767.9, dated Apr. 26, 2018.

Huawei, Ericsson, Qualcomm, CMCC, Verizon; "Summary of a workshop on LTE in Unlicensed Spectrum," 3GPP TSG RAN Meeting #63, Mar. 3-6, 2014, RP-140060.

LG Electronics: "LBT operation details and initial evaluation results", R1-144900, 3GPP TSG RAN WG1 Meeting #79, San Francisco, USA, Nov. 17-21, 2014.

* cited by examiner

METHOD AND APPARATUS FOR PERFORMING CELL ON/OFF OPERATION IN WIRELESS COMMUNICATION SYSTEM

CROSS-REFERENCE TO RELATED APPLICATIONS

The present application is the National Stage filing under 35 U.S.C. 371 of International Application No. PCT/KR2015/004271, filed on Apr. 28, 2015, which claims the benefit of U.S. Provisional Applications No. 61/985,449 filed on Apr. 28, 2014 and No. 62/059,169 filed on Oct. 3, 2014, the contents of which are all hereby incorporated by reference herein in their entirety.

BACKGROUND OF THE INVENTION

Field of the Invention

The present invention relates to wireless communications, and more particularly, to a method and apparatus for performing cell on/off operation in a wireless communication system.

Related Art

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

For small cell enhancements, physical layer aspects have been discussed. Specifically in 3GPP LTE rel-12, when a number of small cells are deployed in a macro cell coverage, the feature of small cell on/off has been discussed, in order to reduce interference, which may occur since all small cells are turned on, and to increase user packet throughput (UPT) of a user equipment (UE). To support fast transition between on/off states of the small cell, various technologies have been studied, one of which is a discovery reference signal (DRS).

A method for transmitting the DRS efficiently may be required.

SUMMARY OF THE INVENTION

The present invention provides a method and apparatus for performing cell on/off operation in a wireless communication system. The present invention provides a method for performing cell on/off operation to support efficient small cell operation as well as operation in unlicensed spectrum. The present invention provides a method for transmitting a reference signal.

In an aspect, a method for transmitting, by an evolved NodeB (eNB), a periodic reference signal in a wireless communication system is provided. The method includes configuring, by the eNB, a periodic reference signal, and transmitting, by the eNB, the periodic reference signal in a specific duration.

In another aspect, an evolved NodeB (eNB) includes a memory, a transceiver, and a processor coupled to the memory and the transceiver, and configured to configure a periodic reference signal, and transmit the periodic reference signal in a specific duration.

Discovery signals can be transmitted efficiently.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
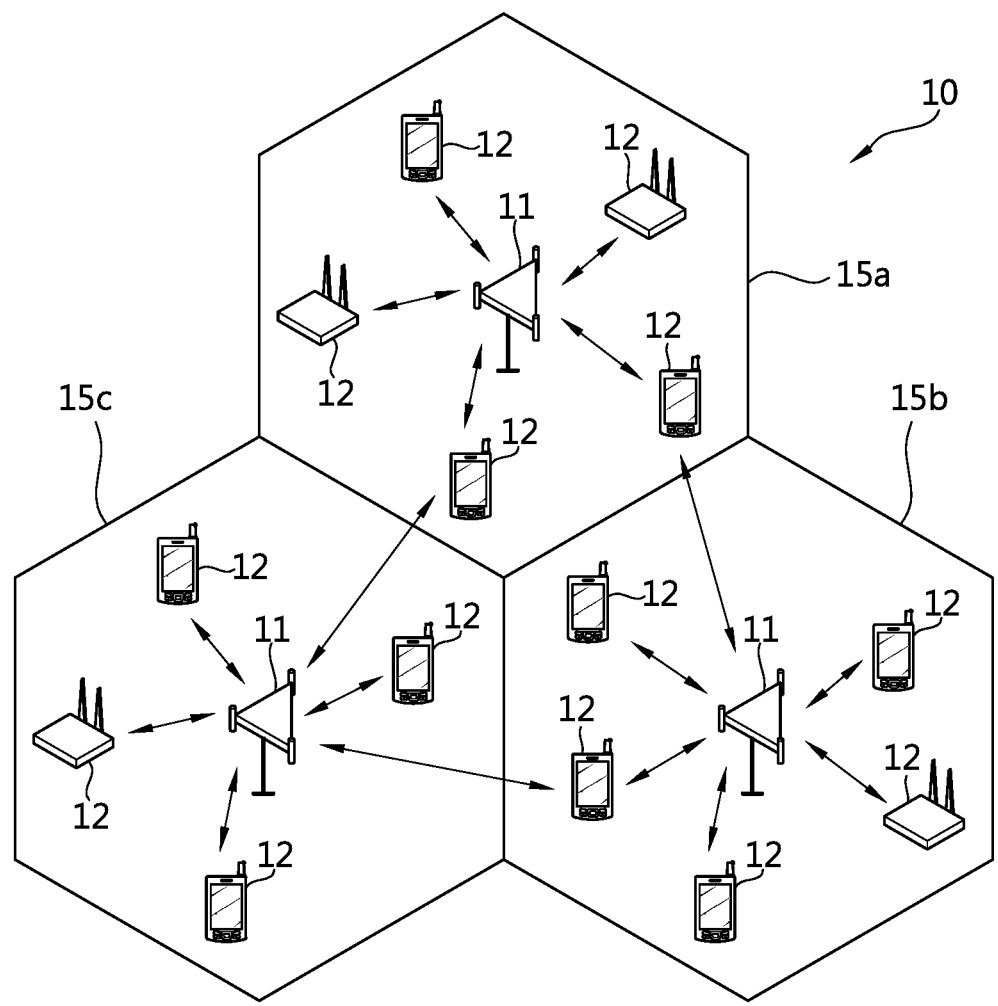
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
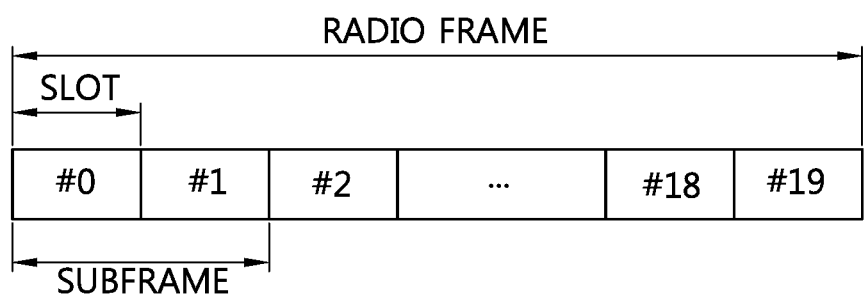
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
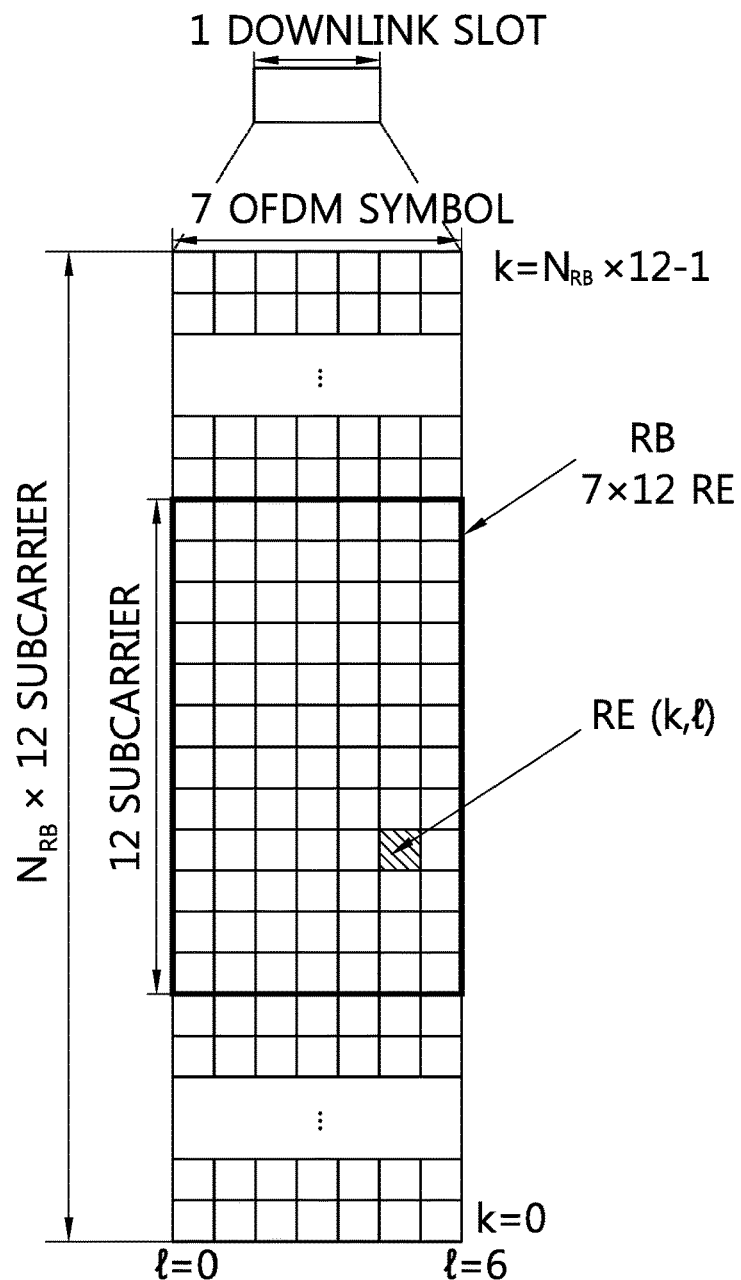
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
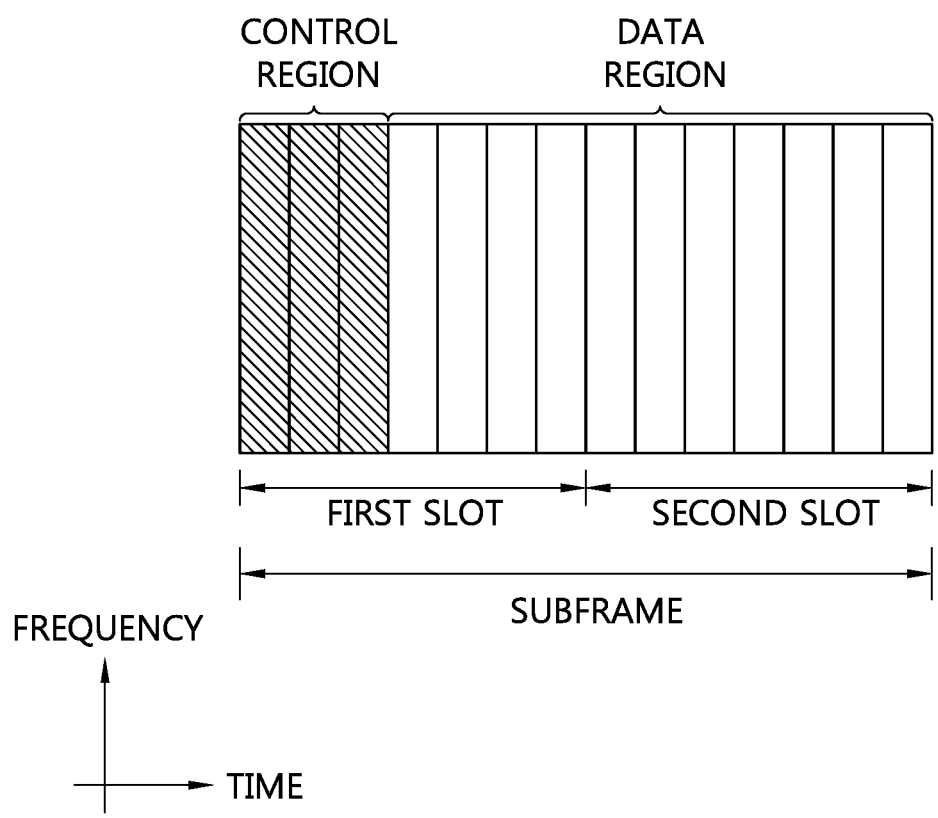
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
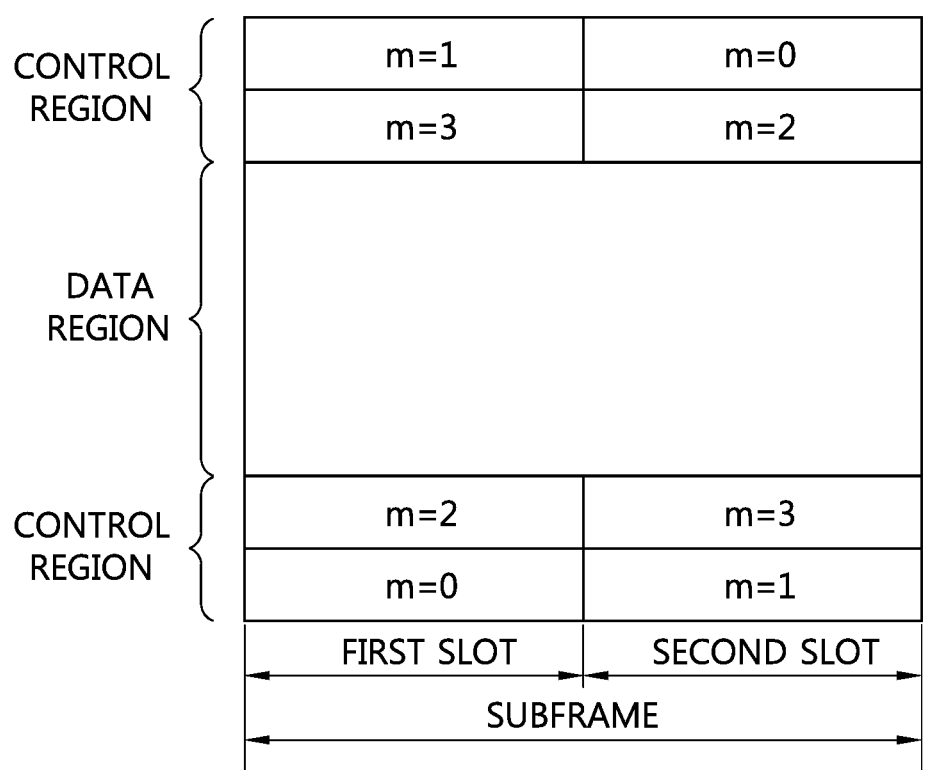
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In unlicensed spectrum where LTE devices may coexist with other radio access technology (RAT) devices such as Wi-Fi, Bluetooth, etc., it is necessary to allow a UE behavior adapting various scenarios. In LTE in unlicensed spectrum (LTE-U), various aspects for 3GPP LTE described above may not be applied for LTE-U. For example, the TTI described above may not be used for LTE-U carrier where variable or floating TTI may be used depending on the schedule and/or carrier sensing results. For another example, in LTE-U carrier, rather than utilizing a fixed DL/UL configuration, dynamic DL/UL configuration based on scheduling may be used. However, due to UE characteristics, either DL or UL transmission may occur at time. For another example, different number of subcarriers may also be utilized for LTE-U carrier.

In general, a UE should be able to cope with following two conditions:
(1) A cell may perform dynamic on/off operation: in this case, a UE may not be able to assume that a cell always transmits some signals such as a cell specific references signal (CRS). This is mainly to address the shared medium by multiple devices where each device may acquire the channel by contention based access scheme, e.g., listen-before-talk (LBT).
*(2) Fluctuating and unpredictable interference: in this case, a UE may not be able to assume that the channel condition will be stable or the interference can be averaged over a long time period. Since there is a hidden node whose transmission is not known to the transmitter, the transmitter may transmit assuming that the channel is idle which causes collision and/or low quality of reception at the intended receiver. Given that uncoordinated transmissions among hidden devices, interference may fluctuate.

Accordingly, to cope with the conditions described above, a method for tailoring cell on/off operation and discovery procedures efficiently may be required. Hereinafter, various methods for providing cell on/off operation and discovery procedures for supporting LTE-U and/or LTE in shared spectrum according to embodiments of the present invention are described.

First, cell discovery according to an embodiment of the present invention is described. It is expected that a UE may be associated with unlicensed spectrum carrier as a secondary cell (SCell) only, as the unlicensed spectrum may not satisfy the primary cell (PCell) management functionality such as continuous measurement signal transmission, reference signal (RS) transmission for radio link failure (RLF) operation, etc. Thus, hereinafter, it is assumed that the unlicensed spectrum operation is performed on a SCell. However, the present invention is not limited thereto, and the present invention can be applied to the PCell if applicable.

When the network is willing to perform data offloading using unlicensed spectrum, depending on traffic offloading scenario, either Wi-Fi based offloading or LTE-U based offloading may be considered. If the LTE-U based offloading is considered, the discovery of LTE-U eNB/BS needs to be performed. In this case, since it is not easily feasible to assume that discovery or synchronization signals are transmitted continuously or periodically with deterministic interval, two approaches may be considered as follows.
(1) Discovery signals are transmitted in the PCell frequency or a dedicated frequency instead of unlicensed spectrum. By this mechanism, the UE may perform cell detection in a LTE carrier.
(2) Discovery signals are transmitted rather periodically and less frequently (for example every 100 ms).

However, when using the first approach, it is not desirable to perform radio link management (RRM) measurement, as the actual interference cannot be measured in a different frequency. Meanwhile, the second approach requires some mechanism which allows periodic transmission of discovery signals. Hereinafter, the second approach described above is focused, and a method for transmitting discovery signals periodically according to an embodiment of the present invention is described.

Assuming that there is overlaid macro layer or a controlling eNB which controls and manages the interval and offset of discovery signal transmission, it may be assumed that each LTE-U eNB/cell is pre-configured with interval/offset for discovery signal transmission. Furthermore, it may be also assumed that duration of discovery signal is predetermined as well. This may be done via x2 signaling.

Figure 6:
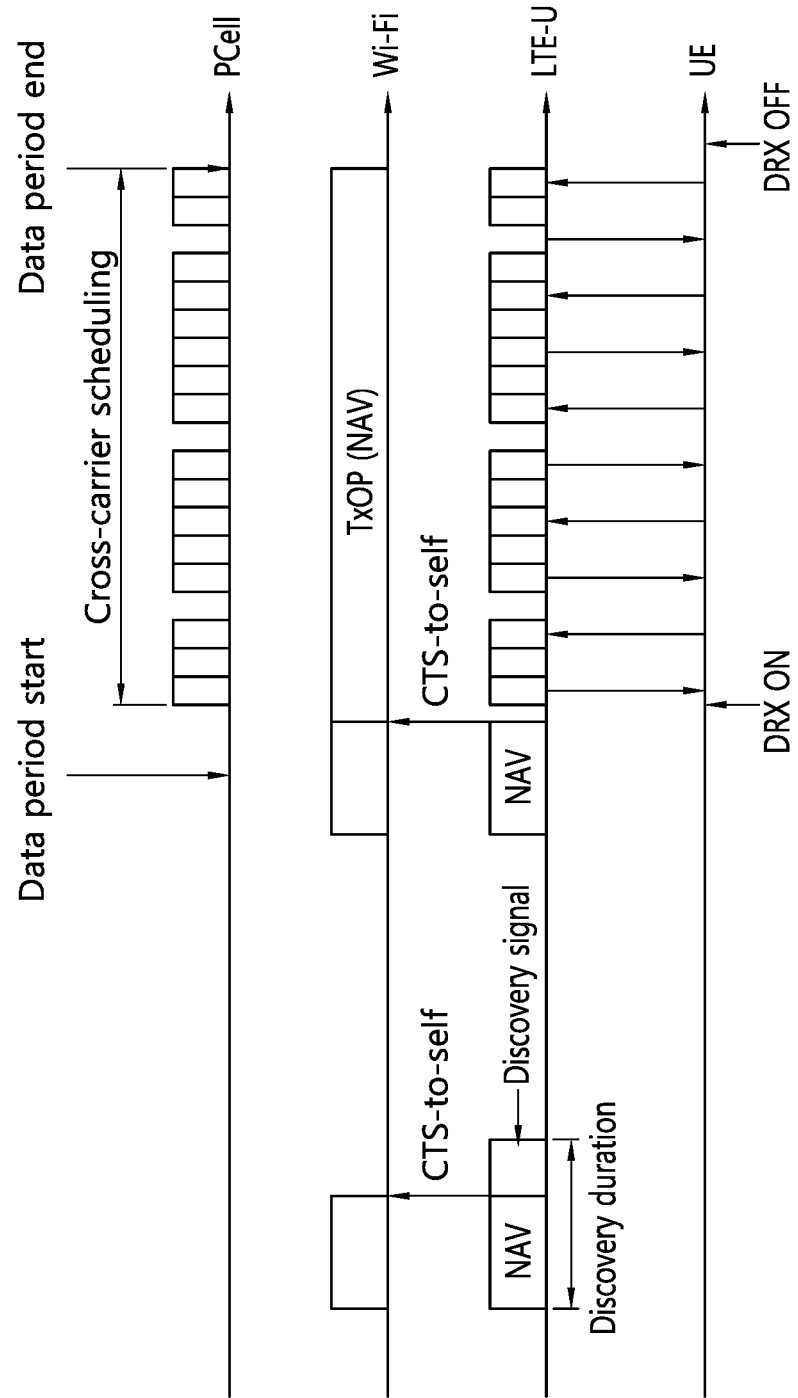
FIG. 6 shows an example of and interval and offset of discovery signal transmission.

FIG. 6 shows an example of and interval and offset of discovery signal transmission. During discovery duration, the LTE-U eNB may wait until the channel becomes idle, and then transmit discovery signals. Since channel may be busy for a long time, a UE may not be able to assume that discovery signal will be always present in the configured discovery duration or measurement timing configuration. To allow concurrent discovery signal transmission from multiple LTE-U eNBs, a mechanism of carrier sensing and channel reservation for discovery signal transmission may be necessary.

Assuming that LTE-U eNB may follow Wi-Fi carrier sensing protocol, to allow concurrent discovery signal transmission from LTE-U eNB, one mechanism may be considered is as follows.
(1) If request to send (RTS) or clear to send (CTS) is received from non-LTE devices such as Wi-Fi AP, a network allocation vector (NAV) timer is set.
(2) If the NAV timer is set, the LTE-U eNB waits until the NAV timer expires.
(3) Upon the NAV timer expires, the LTE-U eNB transmits CTS-to-self (or RTS) to reserve the channel. Similar to beacon transmission, the LTE-U eNB may defer point coordination function (PCF) interframe space (PIFS) and start to transmit. Alternatively, the LTE-U eNB may transmit LTE-signal such as reservation signal which may not be understood by Wi-Fi devices, yet, as the channel becomes busy, Wi-Fi station may defer its transmission.

In this case, as a simple mechanism to coexist with Wi-Fi devices, the LTE-U eNB or LTE-U UE (hereinafter, LTE-U device) may utilize the embedded Wi-Fi module to receive Wi-Fi signals and perform carrier sensing and medium access. In other words, from the protocol aspects, the LTE-U device may follow Wi-Fi protocols and receive Wi-Fi signals as if it is a Wi-Fi device, and may transmit LTE signals as if it is a LTE device when the channel becomes idle. For example, the LTE-U eNB may receive Wi-Fi signals as if it is a Wi-Fi station (STA), and may transmit LTE signals as if it is a LTE eNB. The overall procedures according to this mechanism are as follows.

When the network is in non-TX mode, the LTE-U device may enable Wi-Fi receiver module and comply with Wi-Fi protocol. In terms of Wi-Fi protocol, the LTE-U device may follow the frequency on which it operates. For example, in 5 GHz range, if the eNB has co-equipped 802.11ac AP, the LTE-U device may follow 802.11ac protocol. Following Wi-Fi protocol, the LTE-U device sets NAV and associated timer.

When the network has data to transmit, the LTE-U device may check the channel to acquire the channel Following 802.11 protocol, once the medium is acquired, the LTE-U device may transmit a preamble following Wi-Fi protocol. After transmitting Wi-Fi preamble, the LTE-U device may transmit LTE signals following LTE protocol given a time scheduled for LTE transmission. If there is a gap between the end of Wi-Fi preamble transmission and the start of LTE transmission, a garbage signal or gap signal may be transmitted to fill the gap. Alternatively, the LTE-U device may not transmit Wi-Fi preamble. The LTE-U device may start transmission for a given time without transmitting any Wi-Fi preamble. In such a case, Wi-Fi STA may not be able to detect the signal from the eNB.

Once LTE-transmission time slot ends, the LTE-U device switches to Wi-Fi module and perform Wi-Fi operation.

When the eNB has more data to transmit, the LTE-U device may acquire the channel faster than other Wi-Fi/LTE-U devices following Wi-Fi protocols. To support this operation more efficiently, it is desirable to transmit Wi-Fi preambles with intention of more data/packets. Alternatively, one LTE-transmission time slot may be determined as a fixed time such that the duration is determined as min {time required to transmit data, Max_LTE_TX_Time_Slot}. In other words, one LTE-eNB may be able to occupy the channel at most Max_LTE_TX_Time_Slot (which may be configured by higher layer or determined based on regulation constraints, etc.) by one carrier sensing procedure. After the transmission, the LTE-U device should perform LBT or carrier sensing again to transmit another data.

To comply with Wi-Fi operation, the LTE-U device may have to monitor the channel and listen on data (at least Wi-Fi preamble) continuously regardless of the availability of TX data. Thus, this operation may add power saving burden on LTE eNB regardless of the amount of the data to transmit. Alternatively, to save the battery saving, the LTE-U device may perform Wi-Fi signal monitoring only periodically or upon any data to transmit. This, however, may not fully comply with Wi-Fi protocols.

To transmit a type of periodic signal transmission such as discovery signal, if the eNB following Wi-Fi signals cannot acquire the channel to transmit discovery signal, the LTE-U device may transmit discovery signal via licensed carrier. Otherwise, the signal may be transmitted via unlicensed spectrum.

As the eNB may not allow the UE to associate with its Wi-Fi AP (unless it intends to operate in both modes), the LTE-U device may not transmit Wi-Fi beacon signals.

By listening or complying Wi-Fi protocols, it is expected that the LTE-U eNB will not attempt to transmit any signal while it is expected that ACK transmission will be occurred after data transmission. Once the LTE-U eNB acquires data transmission duration by reading Wi-Fi preamble, it may also expect some additional latency to handle ACK which means that the LTE-U device will not transmit any data during legacy signal (L-SIG) duration which includes delay for ACK.

In summary, to comply with Wi-Fi protocol, the followings may be expected.
  If RTS is received, the appropriate NAV is set according to RTS.
  If CTS is received, the appropriate NAV is set according to CTS.
  If data is received, the appropriate defer window is set according to preamble.
  Upon collision, necessary backoff following Wi-Fi backoff mechanism is performed.

In terms of whether the eNB transmits Wi-Fi preamble or not before transmitting LTE signals, to help inter-operator coexistence, it will be desirable to transmit Wi-Fi preamble such that other operator's eNB may defer its transmission as if it is Wi-Fi transmission. However, note that the embodiment of the present invention may be applied to cases where the LTE eNB may transmit LTE-preamble which may be understood by other LTE eNBs and may transmit signals even though other LTE eNB is transmitting depending on coexistence and inter-cell interference coordination (ICIC) mechanisms. More specifically, preamble may consist of both Wi-Fi preamble and LTE-preamble such that it may reserve the channel (via Wi-Fi-preamble) and also collaborate with LTE cells (via LTE-preamble). For example, if a LTE cell detects neighbor eNB's LTE-preamble, it may assume that the channel is clear and thus transmission can be allowed if the detected interference level is lower than a threshold.

If this is used, carrier sensing not based on RTS/CTS or based on receiving Wi-Fi signals will not be utilized. To minimize Wi-Fi device interruption during discovery signal transmission, it may be further considered to use the same cell ID among LTE-U cells which share the same discovery configuration (i.e., interval and the offset, or having the same overlaid macro layer or belonging to the same small cell cluster). The reason of same cell ID operation is to enhance the hearability of discovery signal in spite of interfering Wi-Fi devices. To be able to differentiate Wi-Fi AP or devices from LTE-U eNB/cell, the address used in CTS-to-self may be prefixed to a certain value or a list of IDs usable in LTE-U eNB/cell may be coordinated among LTE-U cells/eNBs.

Similarly, the transmission interval for data may be pre-configured where each cell may transmit data to an associated LTE device in those configured transmission intervals. In those preconfigured intervals, the same procedure to discovery signal may be performed. The UE may expect data transmission in the configured interval based on cross-carrier scheduling. In other words, the UE may assume that there is data and the cell is on when there is cross-carrier scheduled DCI is present in the PCell or scheduling cell.

In terms of handling periodic transmission, the UE may be configured with discontinuous reception (DRX) operation where the UE would not expect to receive any data during DRX off period including measurement signals. On the other hand, the UE may expect to receive measurement signals as well as data when DRX is on period or during activeTime.

To be more efficient, PCell or scheduling cell may indicate a subframe where discovery signal is transmitted so that the UE can perform cell detection in that subframe. Since the neighbor cell may have different PCell or scheduling cell, its PCell or scheduling cell may transmit a special signal to indicate the transmission of discovery signals. Or, the UE may not perform intra-frequency RRM on unlicensed spectrum. The UE only measure "intra-eNB" carriers where the serving cell is belonging to. In other words, the UE may perform measurement only for cells configured to perform measurement in that frequency. Unless otherwise configured, the UE may not perform cell search or RRM on unlicensed spectrum. This may be done via a black list or other means.

Since discovery signal is transmitted rather periodically, even though the UE is equipped with extra RF/baseband so that the UE can do autonomous inter-frequency cell search/measurement, the UE may perform measurement on unlicensed spectrum only when the UE is configured with a measurement gap and/or measurement configuration including discovery signal transmission and etc. Discovery signal may be a set of primary synchronization signal (PSS)/secondary synchronization signal (SSS)/CRS or a new signal. One example is to use a device-to-device (D2D) discovery signal (D2DSS) such as primary D2DSS (PD2DSS) and/or secondary D2DSS (SD2DSS) and some RS for measurement.

Another approach to transmit periodic discovery signal is not to use carrier sensing or energy detection before transmitting discovery signals. However, this may incur collisions with on-going transmission of Wi-Fi signals and thus reliability of discovery signal may not be desirable. More importantly, when CSI-RS is used for discovery signals, the reliability of CSI-RS is important for reasonable detection performance. Thus, either CSI-RS is not configured for LTE-U frequencies or some means to allow muting and the associated mechanism to enhance the reliability of CSI-RS may be necessary.

In general, the following approaches may be considered to transmit discovery signals according to an embodiment of the present invention.

(1) Always no LBT with periodic transmission of discovery signals: Assuming that the regulation allows short signal transmission without LBT, the network may transmit discovery signals periodically without performing LBT. This approach may degrade the performance of discovery reference signal (DRS). Among cells belonging to the same operator, it may be assumed that DRS transmission period/occasion are aligned. Between inter-operator cells, a type of coordination is assumed such that DRS from different operator may not occur in the same subframe. Another approach is to divide cell identifiers (IDs) among operators such that the UE can differentiate cells from the same operator from cells belonging to different operator(s).

(2) Always LBT with reservation for periodic transmission of discovery signals: To overcome the problem of the first approach described above, it may be assumed that DRS is transmitted with relatively large periodicity such as 40 ms, 80 ms, etc. Before transmitting DRS, the network will perform carrier sensing sufficiently ahead such that it will prevent any Wi-Fi transmission occur in DRS occasion subframes. For example, DRS occasion may consist of 3 subframe every 40 ms, the maximum Wi-Fi signal transmission period (or the maximum allowed channel occupancy time by the regulation) may be 4 ms (it may be longer or shorter), and the eNB will start sensing 4 ms before DRS transmission. To reserve with the highest priority, the eNB may perform at least one of the followings.

Not performing backoff: When the channel becomes idle, the eNB grabs the channel.

Use very short backoff time: Competing with Wi-Fi, the shorter backoff time than, e.g., short interframe space (SIFS), may be used such that the eNB can acquire the channel immediately after a Wi-Fi device finishes the transmission.

Use very high sensing threshold: By using the high threshold for channel sensing, the eNB may increase the probability of channel acquisition (by detecting that the channel is idle with higher probability)

When the channel becomes idle, the eNB may start to reserve the medium until DRS occasion comes and transmit DRS at DRS occasion. Since the channel occupancy time is limited, reservations (transmitting reservation signals) may be shared among multiple eNBs of the same operator. Or, the eNB may limit the duration of DRS occasion, e.g., to a smaller duration such that the reservation may be accommodated within the maximum channel occupancy duration that some regulation may allow.

Figure 7:
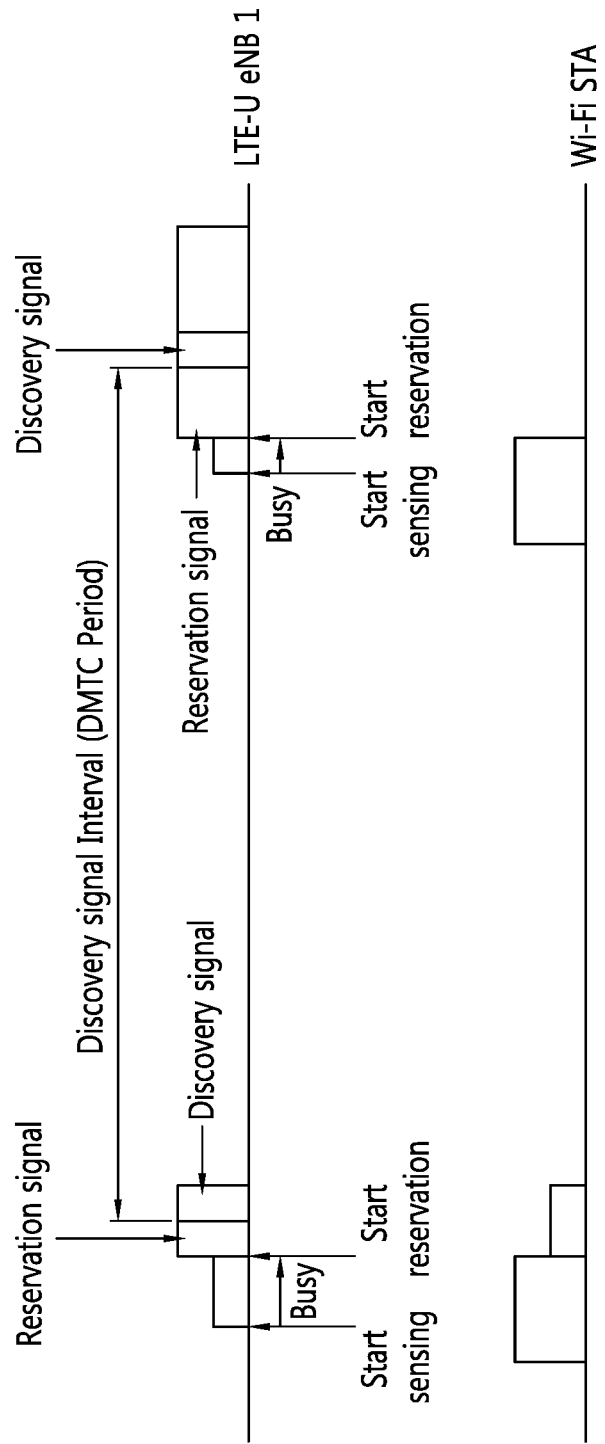
FIG. 7 shows an example of performing LBT with reservation for periodic transmission of discovery signals according to an embodiment of the present invention.

FIG. 7 shows an example of performing LBT with reservation for periodic transmission of discovery signals according to an embodiment of the present invention. Referring to FIG. 7, the LTE-U eNB1 starts carrier sensing to prevent any Wi-Fi transmission occur in DRS occasion subframes. It is assumed that the channel is busy. When the channel becomes idle, the LTE-U eNB1 transmits a reservation signal to reserve the medium until DRS occasion comes. Thereafter, the LTE-U eNB1 transmits a discovery signal.

(3) Always LBT with transmitting periodic discovery signals even when channel is busy: LTE-U device may always perform LBT. However, to guarantee periodic transmission of a certain set of signals such as discovery signal, even though the channel is sensed as busy, the LTE-U device transmits discovery signals. However, if the channel is busy, only discovery signal without any data may be transmitted.

(4) DRS transmission over the associated licensed carrier: Assuming that interference is measured via other measurement such as utilizing wireless local area network (WLAN) measurement, if the only purpose of DRS based measurement is to measure reference signal received power (RSRP), the DRS may be transmitted over licensed carrier. By utilizing inter-frequency measurement, the UE may perform RSRP measurement of a cell in a different frequency than LTE-U frequency. In this case, to perform interference measurement, the UE may perform interference measurement in the LTE-U frequency. In other words, the UE may perform measurement of RSRP in a different frequency such as PCell frequency (e.g., F1) and perform measurement of received signal strength indication (RSSI) in LTE-U frequency (e.g., F2). To perform the interference measurement, the network may configure a separate measurement timing per LTE-U cell or per frequency similar to DRS measurement timing configuration (DMTC) which is specified in 3GPP Rel-12. For RSSI measurement, a new timing configuration per cell or per frequency may be configured as well.

(5) DRS transmission over the associated licensed carrier if the channel is busy: By performing LBT, if the channel is busy at the time of discovery signal transmission, the network may transmit discovery signal to the PCell. Assuming that LTE-U device may be configured to the UE which supports carrier aggregation, it may be assumed that when the network monitors discovery signal from a LTE-U carrier, it may also listen on PCell carrier frequency simultaneously. If this is assumed, if the channel is not available at the given time, discovery signal may be transmitted via PCell frequency. This may require the fast transition of frequency switching at the eNB site (transmission frequency). Thus, this option may not be feasible to all eNBs. Whether this is used or not may be informed to the UE such that the UE can listen on both frequencies simultaneously for the measurements. This approach may not be applicable for inter-frequency measurements. It may be applicable only for intra-frequency measurement where serving cell is configured. If this approach is used, RSRP and reference signal received quality (RSRQ) may be measured separately in different frequency such that RSRP measured in PCell frequency whereas RSRQ measured in LTE-U frequency.

(6) DRS transmission over both the associated licensed carrier and unlicensed spectrum without LBT: If LBT is not used for discovery transmission at unlicensed spectrum, the reliability of signal is not guaranteed. Thus, concurrent transmission of DRS over both carriers may be also considered. In that case, if the eNB is able to transmit concurrent DRS transmissions over two carriers, it may be transmitted simultaneously. From a UE perspective, if concurrent DRS is received, the UE may choose the better quality DRS for RSRP measurements. In this case, as well, RSSI measurement may be performed in unlicensed spectrum regardless of the carrier of RSRP measurement.

(7) Flexible DRS transmission: For example, if there is a certain gap where Wi-Fi will not transmit such as gap for SIFS/distributed co-ordinate function interframe space (DIFS), the discovery signal may be transmitted in that time. Assuming the maximum period of Wi-Fi signal transmission such as 5 ms, there will be at least one of those periods. Thus, those periods may be used for discovery signal transmission. From the UE perspective, this implies that DRS may come in anytime during the window, thus, the UE needs to search the window.

Alternatively, DRS may be transmitted within a window based on carrier sensing results. If the channel is not available during that window, DRS transmission may be dropped. Since the maximum channel usage time may be determined for contending devices, if the window is set larger than that maximum duration of one transmission, it may get the chance of transmission. Not to impact the overall channel utilization, it may be assumed that very shot DRS transmission is used. In this case, as described above, to maximize the success probability of DRS transmission, DRS transmission may have higher priority over other transmissions. For example, no backoff is used for DRS, or short waiting time is used for DRS, or higher sensing threshold is used.

In case that the periodic DRS is transmitted within a window, the UE may take average of DRS signals from the same cell from multiple DRS occasions as long as each DRS occasion is transmitted within a window which is allowed by the network. This way, the UE may have to blindly search the starting subframe of DRS in every DRS occasion and perform measurements/average over multiple DRS occasions.

Though that DRS is transmitted for the purpose of coarse time/frequency tracking and the associated measurements, due to its nature of rather aperiodic transmission of DRS, some further consideration to limit the use of DRS to only RSSI measurement related operation and time/frequency tracking may be considered. In this case, the eNB utilizing unlicensed spectrum may transmit the associated signal in the associated licensed band rather continuously or the UE may measure RSRP using the CRS (or discovery signal) transmitted by the associated carrier. For example, the UE may be configured with a reference cell where the UE can perform RSRP. It may be further configured a restricted subframe set where the UE can perform RSRP measurement on the reference cell. In that case, RSSI may be measured in unlicensed spectrum to capture the interference. However, this may work only co-located eNBs which may operate in both licensed and unlicensed carriers (or one eNB operates in multiple carriers). If the UE is not able to listen on both carriers at the same time, it may switch frequencies for measuring RSSI and RSRP separately. More particularly, for inter-frequency measurement, two time-instances to measure RSRP and RSSI separately may be needed. More specifically, it may be considered that unlicensed carrier will transmit periodic discovery/synchronization signals (other than signals necessary for time/frequency tracking such as aperiodic/discontinuous CRS) without LBT only if the UE does not have any associated licensed carrier which is collocated with unlicensed spectrum such that the RSRP measurement is needed in unlicensed spectrum. Otherwise, it may skip periodic transmission of discovery/synchronization signals.

When the discovery signal is transmitted, to allow dynamic frequency switching between carriers, the cell may indicate the intended carrier which the cell is planning to use during the interval until the next DRS transmission occasion. The information may be carried as a form of payload (which may be captured as PDSCH or physical broadcast channel (PBCH)-like channel) or may be carried as a form of sequence or may be indicated implicitly based on RE location of such as CRS or CSI-RS.

Even though the description above according to an embodiment of the present invention discusses the techniques focused on discovery signals, the present invention may be applied to other control channels such as PUCCH and (E)PDCCH or tracking RS such as CRS or measurement RS such as CSI-RS.

Based on the approaches described above, it is possible that the UE may or may not receive DRS in a given subframe (or subframes) depending on the channel condition. Thus, the UE may apply threshold based DRS detection where if DRS is not detected above a certain threshold, it may assume that DRS has not been transmitted. If it occurs, the UE may inform the network or skip the measurement in that occasion. Additionally, to receive DRS of good quality, the UE may transmit CTS-to-self before DRS transmission occasion if the channel is idle. In terms of transmitting CTS-to-self or similar reservation signal, the UE may or may not perform LBT or carrier sensing.

CSI feedback resource configuration according to an embodiment of the present invention is described. For better UE scheduling, it is desirable to configure CSI feedback. Since it is not necessary to occupy the channel all the time, periodic CSI-RS transmission or CRS transmission (depending on which RS is used for CSI feedback) assumption may be necessary. However, since this periodic CSI transmission may not be easily achievable due to fluctuating delay of channel acquisition, "uncertainty" or "duration" of CSI-RS or CRS transmission may be added to the configuration. For example, when using CSI-RS, in addition to CSI-RS resource and period/offset configuration, "duration" or "uncertainty", which indicates the window where CSI-RS may be transmitted, may be configured. For example, if a value of "uncertainty" field is 4, and the period is 5 ms and offset is 0 ms, CSI-RS may be transmitted in [−2 ms, 2 ms]. The UE may be able to perform blind detection in the window.

This will increase the complexity at the UE, however, it may allow flexibility at eNB side to address some delay to acquire the channel. When the UE detects demodulation reference signal (DMRS) or data transmission in a subframe, it may assume that CSI-RS will be transmitted in the same subframe. Thus, CSI-RS blind detection may be aided by blind detection on other signals or data transmission. The network would not transmit CSI-RS if it does not acquire the channel within that window. Or, within the uncertainty window, the UE may be indicated by PCell or scheduling cell whether the current subframe contains CSI-RS or not. This may be performed by indication via DCI.

For zero power (ZP)-CSI-RS, if the uncertainty is configured, within the window with consideration of uncertainty, data rate matching around the configured ZP-CSI-RS may be assumed. Thus, when the network configures the ZP-CSI-RS with uncertainty, the rate matching may be performed within the window.

Even if CRS is used for CSI feedback, the periodicity of CRS transmission is necessary, as CRS may not be present in all active subframes or CRS cannot be transmitted in every subframe. If not configured, the UE may assume that CRS may not be present in every subframe. Or, a separate CRS transmission may be configured for tracking purpose. For example, CRS transmission in every 5 ms may be configured with uncertainty. Or, if CRS is not used for tracking purpose, the UE may assume that DMRS may be used for tracking. In this case, to assure sufficient DMRS transmission, the UE may assume that more than X PRBs are scheduled to the UE (e.g., X=25) in the subframe.

Figure 8:
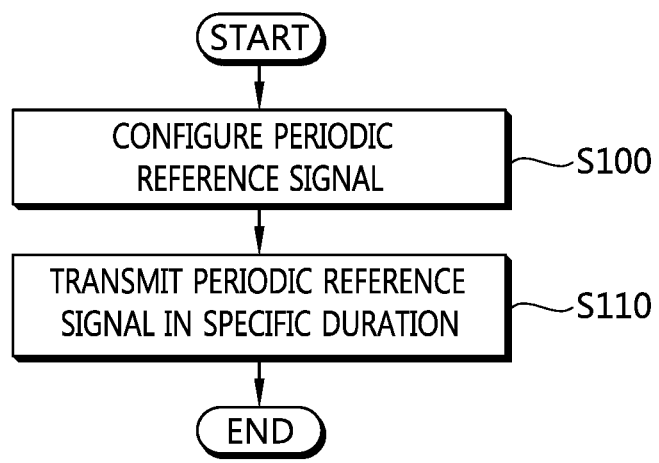
FIG. 8 shows an example of a method for transmitting a periodic reference signal according to an embodiment of the present invention.

FIG. 8 shows an example of a method for transmitting a periodic reference signal according to an embodiment of the present invention. In step S100, the eNB configures a periodic reference signal. In step S110, the eNB transmits the periodic reference signal in a specific duration. The eNB may operate in an unlicensed spectrum. The specific duration may correspond to a duration in which the other RAT or the other operator does not perform transmission. The periodic reference signal may be one of the DRS or CSI RS. For the DRS, an occasion for the DRS may consist of 3 subframes every 40 ms. For the CSI RS, the specific duration for the CSI RS, which indicates a window where the CSI RS may be transmitted, may be configured. Further, the eNB may perform LBT before transmitting the periodic reference signal. Further, the eNB may transmit a reservation signal after performing the LBT and a channel becomes idle.

Figure 9:
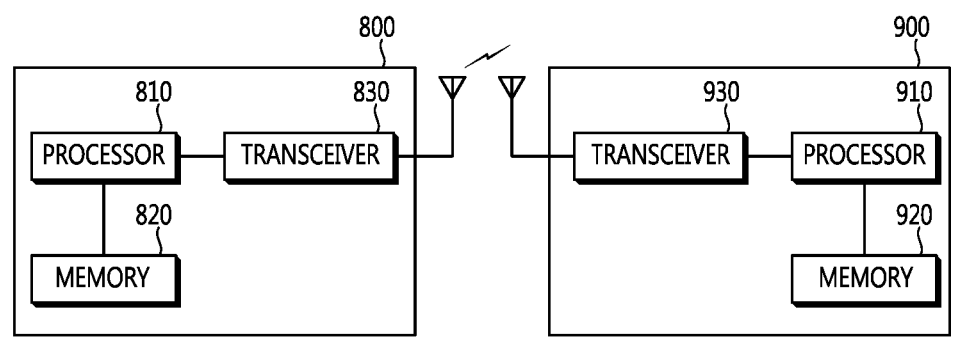
FIG. 9 shows a wireless communication system to implement an embodiment of the present invention.

FIG. 9 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by an evolved NodeB (eNB) which operates in LTE in an unlicensed (LTE-U) spectrum, a discovery reference signal (DRS) in a wireless communication system, the method comprising:
   configuring, by the eNB, a periodic transmission of the DRS with DRS occasion;
   starting, by the eNB, carrier sensing on a channel related to a wireless local area network (WLAN), before the DRS occasion by an amount of time equal to a maximum allowed channel occupancy time of the WLAN;
   detecting, by the eNB, when the channel is idle;
   occupying, by the eNB, the channel immediately after the channel becomes idle;
   transmitting, by the eNB, a reservation signal until the DRS occasion; and
   transmitting, by the eNB, the DRS in the DRS occasion, wherein a periodicity of the DRS occasion is longer than the maximum allowed channel occupancy time.

2. The method of claim 1, wherein the DRS occasion consists of 3 subframes every 40 ms.

3. The method of claim 1, further comprising:
   performing listen-before-talk (LBT) before transmitting the DRS.

4. The method of claim 3, further comprising:
   transmitting the reservation signal after performing the LBT and the channel becomes idle.

5. An evolved NodeB (eNB) which operates in LTE in an unlicensed (LTE-U) spectrum, the eNB comprising:
   a memory;
   a transceiver; and
   a processor, operatively coupled to the memory and the transceiver, wherein the processor is configured to:
   configure a periodic transmission of a discovery reference signal (DRS) with DRS occasion:
   start carrier sensing on a channel related to a wireless local area network (WLAN), before the DRS occasion by an amount of time equal to a maximum allowed channel occupancy time of the WLAN;
   detect when the channel is idle;
   occupy the channel immediately after the channel becomes idle;
   control the transceiver to transmit a reservation signal until the DRS occasion; and
   control the transceiver to transmit DRS in the DRS occasion,
   wherein a periodicity of the DRS occasion is longer than the maximum allowed channel occupancy time.

* * * * *